(12) United States Patent
Akai et al.

(10) Patent No.: US 8,197,760 B2
(45) Date of Patent: Jun. 12, 2012

(54) HEAT MEDIUM HEATING-COOLING APPARATUS AND HEAT MEDIUM TEMPERATURE CONTROL METHOD

(75) Inventors: Yasuaki Akai, Tokyo (JP); Masahiro Yonekura, Tokyo (JP); Masahiro Takeuchi, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 271 days.

(21) Appl. No.: 12/733,725

(22) PCT Filed: Sep. 10, 2008

(86) PCT No.: PCT/JP2008/066318
§ 371 (c)(1),
(2), (4) Date: Mar. 17, 2010

(87) PCT Pub. No.: WO2009/038002
PCT Pub. Date: Mar. 26, 2009

(65) Prior Publication Data
US 2010/0193176 A1      Aug. 5, 2010

(30) Foreign Application Priority Data

Sep. 21, 2007   (JP) .................................. 2007-244629

(51) Int. Cl.
*G05D 23/00* (2006.01)
*B01J 19/00* (2006.01)

(52) U.S. Cl. ........ 422/109; 422/198; 422/200; 422/202; 165/65; 62/50.2; 62/49.2

(58) Field of Classification Search .................. 422/109, 422/198, 200, 202; 165/65; 62/50.2, 48.2
See application file for complete search history.

(56) References Cited

U.S. PATENT DOCUMENTS

| | | | | |
|---|---|---|---|---|
| 2,788,264 A | * | 4/1957 | Bremer et al. | 422/109 |
| 4,549,816 A | * | 10/1985 | Fujioka | 374/27 |
| 4,671,071 A | * | 6/1987 | Sasaki | 62/47.1 |
| 4,744,408 A | * | 5/1988 | Pearson et al. | 165/254 |
| 2007/0104626 A1 | * | 5/2007 | Yonekura et al. | 422/198 |

FOREIGN PATENT DOCUMENTS

JP         2002-301359 A       10/2002

(Continued)

OTHER PUBLICATIONS

International Search Report dated Oct. 14, 2008, issued on PCT/JP2008/066318.

*Primary Examiner* — Walter D Griffin
*Assistant Examiner* — Huy-Tram Nguyen
(74) *Attorney, Agent, or Firm* — Edwards Wildman Palmer LLP

(57) ABSTRACT

Provided are a heat medium heating-cooling apparatus and a heat medium temperature control method, which can control the heat medium temperature stably and more efficiently. The heat medium heating-cooling apparatus includes a heat medium heating unit (12) as well as a bypass line (19) thereof with switching valves 20a, 20b switching the direction of a flow of the heat medium to the heat medium heating unit or the bypass line. Decisions are made based on the present temperature (PV) in a reactor (11), a preset target temperature (SV), stable temperature range ($\alpha$) and control switching temperature ($\beta$). According to the resulted four decisions of "stable heating", "stable cooling", "inclined heating" and "inclined cooling", the temperature control according to either of the heating control at a heating control unit or the cooling control at a cooling control unit is conducted.

8 Claims, 3 Drawing Sheets

FOREIGN PATENT DOCUMENTS

| | | |
|---|---|---|
| JP | 2004-100970 A | 4/2004 |
| JP | 2005-329293 A | 12/2005 |
| JP | 2006-272291 A | 10/2006 |
| JP | 2007-127334 A | 5/2007 |

* cited by examiner

HEAT MEDIUM HEATING-COOLING APPARATUS AND HEAT MEDIUM TEMPERATURE CONTROL METHOD

TECHNICAL FIELD

The present invention relates to a heat medium heating-cooling apparatus and a heat medium temperature control method, more particularly to a temperature control apparatus for heating or cooling a heat medium to conduct a temperature control of a reactor to be used in a chemical reaction process, etc. and a method for controlling the temperature of the heat medium.

BACKGROUND ART

Since a chemical reaction process, such as organic synthesis and crystallization, requires a high precision temperature control, a double shell structure vessel is employed for a reactor, which is surrounded by a jacket allowing a heat medium to flow through as a temperature regulating unit. The heat medium is regulated at a preset temperature and circulated through the jacket to maintain the internal temperature of the reactor at a preset temperature (e.g. see Patent Document 1).
Patent Document 1: Japanese Patent Laid-Open No. 2007-127334.

DISCLOSURE OF THE INVENTION

Problems to be Solved by the Invention

Although a heat medium heating-cooling apparatus described in Patent Document 1 can regulate the heat medium temperature efficiently, in case there is intensive heat intrusion from a heat medium heating unit or a circulation pump, it has been difficult to regulate the heat medium to a preset temperature with a high degree of accuracy.

Under such circumstances, an object of the present invention is to provide a heat medium heating-cooling apparatus and a heat medium temperature control method, that can perform a temperature control of a heat medium efficiently and stably.

Means for Solving the Problems

In order to attain the object, a heat medium heating-cooling apparatus according to the present invention comprises a reactor whose temperature is controlled by a heat medium; a heat medium heating unit that heats the heat medium by an indirect heat exchange with a heating fluid; a heat medium cooling unit that cools the heat medium by an indirect heat exchange with a cooling fluid; and a circulation pump and line that circulate the heat medium through the reactor, the heat medium heating unit, and the heat medium cooling unit; wherein the heat medium heating-cooling apparatus further comprises a bypass line bypassing the heat medium heating unit; and a switching valve switching the direction of a flow of the heat medium to the heat medium heating unit or the bypass line. Preferably, the switching valve can switch the flow of the heat medium to the bypass line, in case an apparatus trouble should occur.

Further, the heat medium heating-cooling apparatus according to the present invention comprises a reactor temperature measuring means measuring the present temperature of the reactor; a heat medium temperature measuring means measuring the temperature of the heat medium fed to the reactor; a target temperature setting means setting a target temperature of the reactor; a stable temperature range setting means setting a tolerable range of a difference between the present temperature and the target temperature as a stable temperature range; a control switching temperature setting means setting a control switching temperature for switching a control between a cooling control and a heating control, when the difference between the present temperature and the target temperature is within the stable temperature range; a stable temperature deciding means deciding whether or not the temperature difference between the present temperature and the target temperature is within the stable temperature range; a first deciding means deciding which of the heating control or the cooling control is conducted within the stable temperature range by comparing the target temperature and the control switching temperature when the temperature difference is within the stable temperature range; a second deciding means deciding which of the heating control or the cooling control is conducted toward the target temperature by comparing the target temperature and the present temperature when the temperature difference is not in the stable temperature range; a heating control unit activating the heat medium heating unit to heat the heat medium when the first deciding means or the second deciding means decides on the heating control; and a cooling control unit activating the heat medium cooling unit to cool the heat medium when the first deciding means or the second deciding means decides on the cooling control.

Further, the heat medium temperature measuring means is a double element thermal sensing device that outputs measured temperature signals to the heating control unit and the cooling control unit respectively. The reactor temperature measuring means measures at least one of the temperature in the reactor, the temperature of the heat medium inflowing to a temperature regulating unit of the reactor, or the temperature of the heat medium outflowing from a temperature regulating unit of the reactor. The switching valve switches the flow of the heat medium to the bypass line when the cooling control unit conducts the cooling control on the heat medium.

A heat medium temperature control method for the heat medium heating-cooling apparatus according to the present invention is a method for controlling the temperature of a heat medium in the heat medium heating-cooling apparatus. When the temperature difference between a present temperature of a reactor and a target temperature of the reactor is within a preset stable temperature range, the target temperature and a preset control switching temperature are compared and either of a heating control or a cooling control is conducted within the stable temperature range; and when the temperature difference between a present temperature of a reactor and a target temperature of the reactor is not within a preset stable temperature range, the target temperature and the present temperature are compared and either of a heating control or a cooling control is conducted toward the target temperature.

Effects of the Invention

According to the present invention, heat intrusion from the heat medium heating unit can be suppressed and the efficiency of the heat medium temperature control can be improved. Since a heating control and a cooling control are conducted under separate conditions, the response to control is good and the temperature control can be carried out at high energy efficiency without wasteful heating or cooling.

DESCRIPTION OF SYMBOLS

11 . . . reactor, 11a . . . jacket, 12 . . . heat medium heating unit, 12a . . . heat medium channel, 12b . . . heating fluid channel, 13 . . . heat medium cooling unit, 13a . . . heat medium channel, 13b . . . cooling fluid channel, 14 . . . circulation pump, 15 . . . heat medium flowmeter, 16a . . . heating fluid feed line, 16b . . . heating fluid return line, 17 . . . heating fluid flow rate control valve, 18 . . . heating fluid flowmeter, 19 . . . bypass line, 20a, 20b . . . switching valve, 21a . . . cooling fluid feed line, 21b . . . cooling fluid return line, 22 . . . cooling fluid flow rate control valve, 23 . . . heat medium thermal sensing device, 24 . . . reactor thermal sensing device, 25 . . . heating-cooling control unit, and 25a . . . entry device.

BEST MODE FOR CARRYING OUT THE INVENTION

Figure 1:
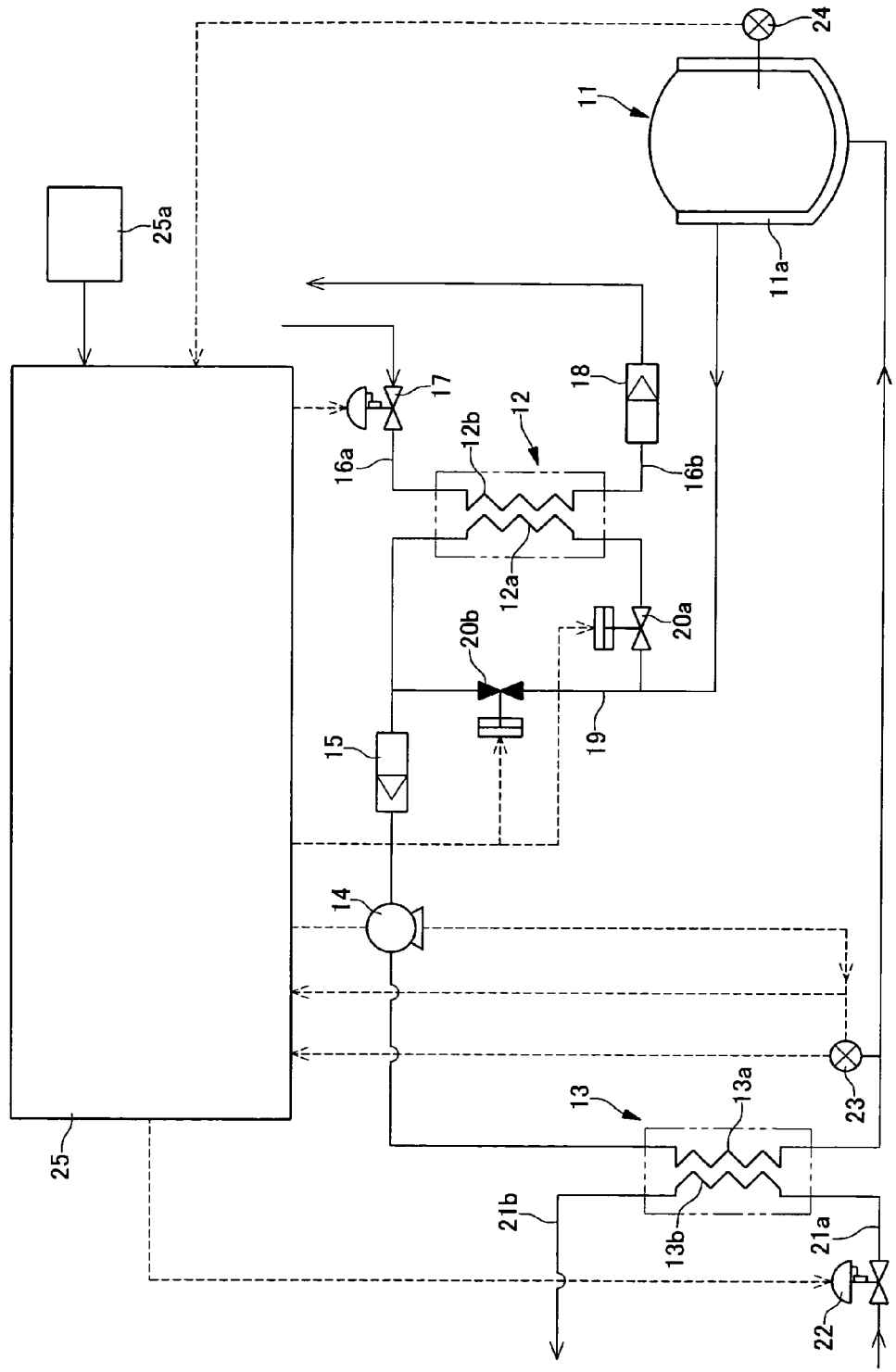
FIG. 1 is a flow diagram of an embodiment of the heat medium heating-cooling apparatus according to the present invention.

FIG. 1 is a flow diagram of an embodiment of the heat medium heating-cooling apparatus according to the present invention. The heat medium heating-cooling apparatus includes a reactor 11 whose temperature is controlled by a heat medium flowing through a jacket 11a functioning as a temperature regulating unit; a heat medium heating unit 12 that heats the heat medium outflowing from the jacket 11a by an indirect heat exchange with a heating fluid; a heat medium cooling unit 13 that cools the heat medium flowing to the jacket 11a by an indirect heat exchange with a cooling fluid; and a circulation pump 14 circulating the heat medium through the jacket 11a of the reactor 11, the heat medium heating unit 12 and the heat medium cooling unit 13 as well as a circulation line connecting them; and a heat medium flowmeter 15 is provided on a suction side of the circulation pump 14.

The heat medium heating unit 12 is so configured with a heat medium channel 12a and a heating fluid channel 12b that heat exchange therebetween is possible. The heating fluid channel 12b is connected with a heating fluid feed line 16a and a heating fluid return line 16b, while the heating fluid feed line 16a is equipped with a heating fluid flow rate control valve 17 and the heating fluid return line 16b is equipped with a heating fluid flowmeter 18. Further, at the heat medium heating unit 12, a bypass line 19 is provided to bypass the heat medium heating unit 12, and a pair of switching valves 20a, 20b are provided to switch the direction of a flow of the heat medium to the heat medium heating unit 12 or to the bypass line 19. The switching valves 20a, 20b are so configured that, when one is open, the other is shut. An integrated type switching valve may be also applicable.

Meanwhile, the heat medium cooling unit 13 is so configured with a heat medium channel 13a and a cooling fluid channel 13b, that heat exchange therebetween is possible. The cooling fluid channel 13b is connected with a cooling fluid feed line 21a and a cooling fluid return line 21b, while the cooling fluid feed line 21a is equipped with a cooling fluid flow rate control valve 22. Further, in the vicinity of the exit of the heat medium channel 13a a double-element heat medium thermal sensing device 23 is provided as a heat medium temperature measuring means, and at the reactor 11a reactor thermal sensing device 24 is provided as a reactor temperature measuring means measuring a present temperature in the reactor.

In case direct measurement of the present temperature in the reactor 11 is difficult, a thermal sensing device placed at the inflowing section or the outflowing section of the jacket 11a may be utilized as a reactor temperature measuring means. Further, the temperature regulating unit for the reactor 11 may be a heat medium coil inside the reactor 11 in place of the jacket 11a.

In the heat medium heating-cooling apparatus configured as above, the temperature inside the reactor 11 is regulated to a preset target temperature by controlling the temperature of the heat medium circulating to the jacket 11a by means of a heating-cooling control unit 25. The heating-cooling control unit 25 conducts the control by receiving a present temperature PV of the reactor measured by the reactor thermal sensing device 24 and a heat medium temperature KV measured by the heat medium thermal sensing device 23 as data for the control. The heating-cooling control unit 25 has a target temperature setting means setting a target temperature SV of the reactor 11 in the form of an entry device 25a for entering a pre-determined set value; a stable temperature range setting means setting a stable temperature range $\alpha$ as a tolerable range of the difference between the present temperature PV and the target temperature SV; and a control switching temperature setting means setting a control switching temperature $\beta$ for switching a control between a cooling control and a heating control, when the difference between the present temperature PV and the target temperature SV is within the stable temperature range $\alpha$.

The heating-cooling control unit 25 has further a decision unit deciding temperature conditions of the apparatus based on the present temperature PV, the target temperature SV, the stable temperature range $\alpha$ and the control switching temperature $\beta$; a heating control unit activating solely the heat medium heating unit 12, and a cooling control unit activating solely the heat medium cooling unit 13, in accordance with the decision by the decision unit. A sensed temperature signal on the heat medium temperature KV measured by the heat medium thermal sensing device 23 is output to the heating control unit and the cooling control unit separately.

The decision unit has a stable temperature deciding means deciding whether or not the temperature difference MV between the present temperature PV and the target temperature SV is within the stable temperature range $\alpha$; the first deciding means deciding which of the heating control or the cooling control should be conducted within the stable temperature range $\alpha$ by comparing the target temperature SV and the control switching temperature $\beta$ when the temperature difference MV is within the stable temperature range $\alpha$; and the second deciding means deciding which of the heating control or the cooling control should be conducted toward the target temperature SV by comparing the target temperature SV and the present temperature PV when the temperature difference MV is not in the stable temperature range $\alpha$.

An action example of the heating-cooling control unit 25 will be described with reference to the flowchart of an example of a decision procedure in FIG. 2 and the graph of an example temperature time course in FIG. 3. Prior to the initiation of the temperature control are preset respectively a target temperature SV for a treatment, such as organic synthesis and crystallization; a stable temperature range $\alpha$ tolerable with respect to the target temperature in executing the treatment; and a control switching temperature $\beta$ to be determined appropriately depending on a environment temperature, etc. In this embodiment, the target temperature SV is changed as: $-80°$ C.$\rightarrow -60°$ C.$\rightarrow +50°$ C.$\rightarrow +20°$ C.$\rightarrow -110°$ C. The stable temperature range $\alpha$ is set at $5°$ C., and the control switching temperature $\beta$ is set at $+20°$ C. respectively.

The present temperature PV inside the reactor 11 at the initiation of the operation measured by the reactor thermal sensing device 24 is 0° C. (point A in FIG. 3). At the step 101, the temperature difference between the pre-set target temperature SV and the present temperature PV inside the reactor 11 is calculated by the stable temperature deciding means, and whether or not the obtained temperature difference is within the stable temperature range α, namely within the range of ±5° C., is decided. Since at this time point the target temperature SV is −80° C. and the present temperature PV is 0° C., the temperature difference (SV−PV) becomes −80° C. which is not within the stable temperature range α (±5° C.) (decision "No"), and the flow goes to the step 102 to decide that the temperature condition is "Not stable".

Then the flow proceeds to the step 103 of the second deciding means, where the temperature difference is calculated by subtracting the present temperature PV from the target temperature SV, to discriminate whether or not the temperature difference exceeds 0° C. In this connection, since the step 103 is reached through the decision at the step 101, the temperature difference (SV−PV) does not fall within the ±5° C. range.

Since the temperature difference (SV−PV) at the step 103 is −80° C. and not beyond 0° C. (decision "No"), the flow goes to the step 104 to decide on "inclined cooling" requiring continuous cooling. If, as in this case, the decision unit decides on the "inclined cooling", at the step 105 the execution of the temperature control based on the "inclined cooling" is decided.

By the "inclined cooling" the cooling control unit is activated to open the cooling fluid flow rate control valve 22 at the heat medium cooling unit 13 to introduce a cooling fluid (for example, liquid nitrogen) into the cooling fluid channel 13b and to chill the heat medium flowing in the heat medium channel 13a, and the heat medium is then introduced into the jacket 11a to chill the reactor 11 to the target temperature SV. During the execution of the "inclined cooling", the heating control unit is in a deactivated state closing the switching valve 20a to the heat medium heating unit 12 and opening the switching valve 20b to the bypass line 19. Accordingly, the heat medium is blocked from flowing through the heat medium heating unit 12 to suppress the heat intrusion to the heat medium and to prevent the heating fluid in the heating fluid channel 12b from freezing by the low temperature heat medium.

Meanwhile, at the heat medium heating unit 12, even in the deactivated state, the heating fluid flow rate control valve 17 is opened slightly to flow the heating fluid through the heating fluid channel 12b at an appropriate flow rate so as to prevent surely the heating fluid from freezing in the heating fluid channel 12b.

With the time progress of the "inclined cooling" the present temperature PV in the reactor 11 decreases (to point B in FIG. 3), and if the temperature difference between the target temperature SV and the present temperature PV falls within the stable temperature range α by the decision at the step 101 (decision "Yes"), the flow proceeds to the step 106 to decide on a "stable" temperature condition and further proceeds to the step 107 of the first deciding means to decide whether or not the target temperature SV is equal to or higher than the control switching temperature β. In this case the target temperature SV is −80° C. and the control switching temperature β is +20° C., and therefore the target temperature SV is not equal to or higher than the control switching temperature β (decision "No"). The flow goes to the step 108 to decide on "stable cooling" and the temperature control at the step 105 conducts the temperature control based on the "stable cooling".

By the "stable cooling" the lift of the cooling fluid flow rate control valve 22 is regulated based on the present temperature PV measured by the reactor thermal sensing device 24 and the heat medium temperature KV measured by the heat medium thermal sensing device 23 to regulate the flow rate of the cooling fluid to cool the heat medium to an appropriate temperature performing a cooling control in answer to a temperature increase in the reactor 11 by heat intrusion from the circulation pump 14, etc. During the execution of the "stable cooling" the heating control unit is kept in a deactivated state, as during the execution of the "inclined cooling".

Next, when the target temperature SV is changed from −80° C. to −60° C. (point C in FIG. 3), the temperature difference between the target temperature SV and the present temperature PV gives +20° C. by the decision at the step 101 (decision "No"), and consequently the flow proceeds through the step 102 to the step 103 to find the temperature difference by subtracting the present temperature PV from the target temperature SV. In this case the temperature difference gives +20° C. (decision "Yes") and the following step 109 decides on the execution of the "inclined heating" requiring a continuous heating. When the decision unit decides on the "inclined heating", the step 105 executes the temperature control based on the "inclined heating".

By the "inclined heating" the heating control unit is activated and the switching valve 20a to the heat medium heating unit 12 is opened, while the switching valve 20b to the bypass line 19 is shut, and the heating fluid flow rate control valve 17 is opened to circulate a heating fluid (e.g. warm water) through the heating fluid channel 12b and to heat up the heat medium flowing through the heat medium channel 12a. While the cooling control unit is left in a deactivated state during the execution of the "inclined heating", and, closing the cooling fluid flow rate control valve 22, the cooling of the heat medium is not performed at the heat medium cooling unit 13. As the result, the heat medium heated at the heat medium heating unit 12 is introduced into the jacket 11a to heat up the reactor 11 to the target temperature SV.

When, with the progress of the "inclined heating", the decision is made at the step 101 that the temperature difference between the target temperature SV and the present temperature PV has fallen within the stable temperature range α (point D in FIG. 3), the flow proceeds similarly as above to the step 106, the step 107, and then to the step 108 to decide on the execution of the "stable cooling", and the temperature control based on the "stable cooling" is conducted similarly as above.

Next, if the target temperature SV is changed from −60° C. to +50° C. (point E in FIG. 3), the temperature difference between the target temperature SV and the present temperature PV is found by the decision at the step 101 to be +110° C. (decision "No"), by the step 102, the step 103, and the step 109 the execution of the "inclined heating" is decided and the step 105 conducts the temperature control based on the "inclined heating" similarly as above.

When, with the progress of the "inclined heating", the decision is made at the step 101 that the temperature difference between the target temperature SV and the present temperature PV has fallen within the stable temperature range α (point F in FIG. 3), the flow proceeds similarly as above from the step 106 to the step 107 to decide whether or not the target temperature SV is equal to or higher than the control switching temperature β. In this case the target temperature SV is +50° C. and the control switching temperature β is +20° C., and therefore the target temperature SV is higher than the control switching temperature β (decision "Yes"). Proceeding to the step 110 to decide on the execution of the "stable heating", the temperature control based on the "stable heating" is conducted in the temperature control at the step 105.

By the "stable cooling" the lift of the heating fluid flow rate control valve 17 is regulated based on the present temperature PV measured by the reactor thermal sensing device 24 and the heat medium temperature KV measured by the heat medium thermal sensing device 23, to regulate the flow rate of the heating fluid fed to the heating fluid channel 12b heating the heat medium to an appropriate temperature, thus performing a heating control in answer to a temperature decrease in the reactor 11 by heat dissipation, etc. During the execution of the "stable heating" the cooling control unit is kept in a deactivated state, as during the execution of the "inclined heating".

Next, when the target temperature SV is changed from +50° C. to +20° C. (point G in FIG. 3), by the decision at the step 101 (decision "No") the flow proceeds through the step 102 to the step 103, then by the decision at the step 103 (decision "No") to the step 104 for the "inclined cooling", and further to the step 105 to execute the temperature control based on the "inclined cooling". When the present temperature PV enters the stable temperature range α with respect to the target temperature SV (point H in FIG. 3), by the decision at the step 101 (decision "Yes") the flow proceeds through the step 106 to the step 107, (decision "Yes") as the target temperature SV (+20° C.) being equal to the control switching temperature β (+20° C.), and further to the step 110 to decide on the "stable heating". Then, at the step 105 the temperature control based on the "stable heating" is conducted. Furthermore, when the target temperature SV is changed from +20° C. to −110° C. (point I in FIG. 3), after the temperature control based on the "inclined cooling" is conducted, the temperature control based on the "stable cooling" is initiated (point J in FIG. 3) similarly as above.

Figure 2:
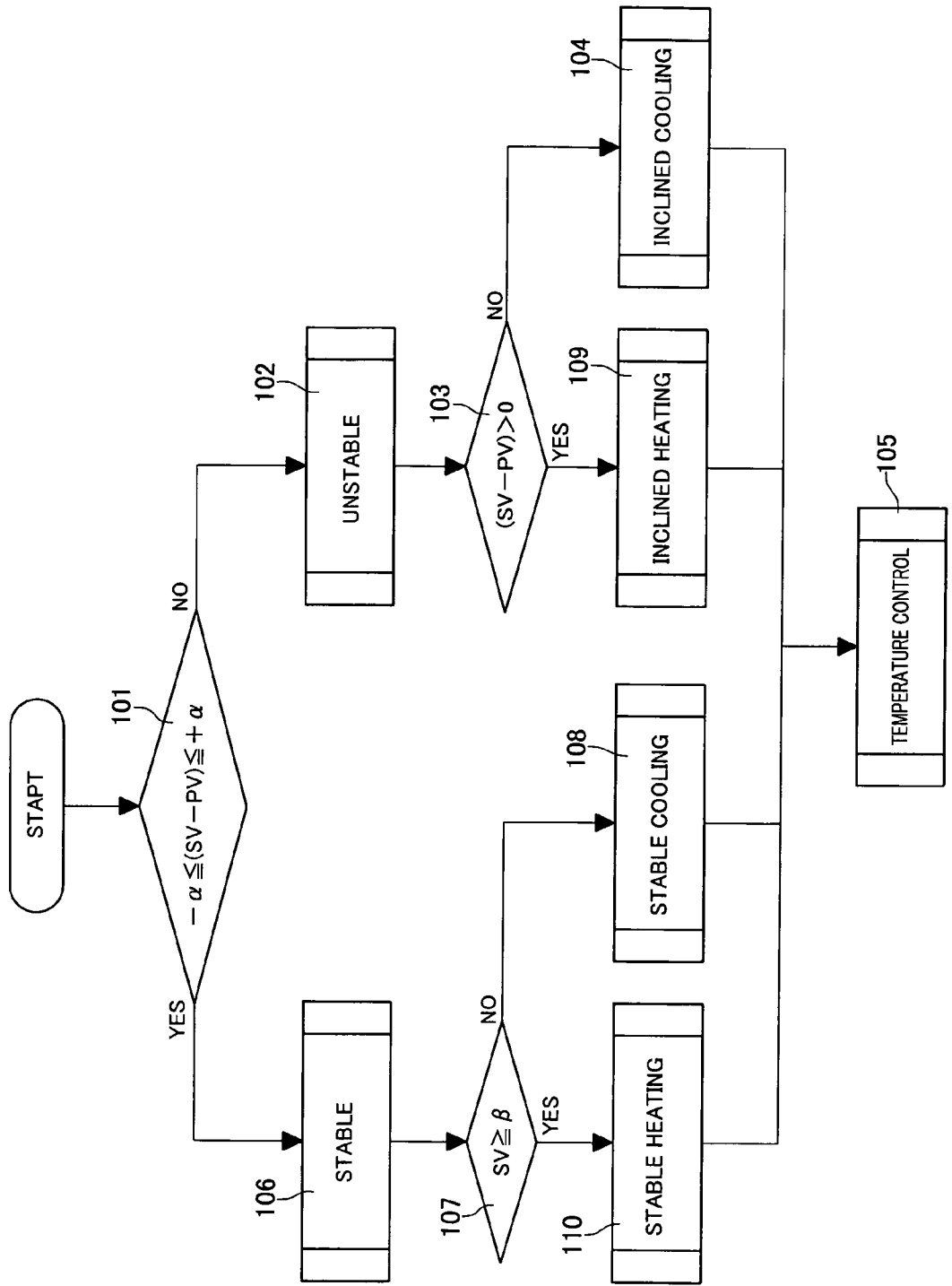
FIG. 2 is a flowchart of an example of a decision procedure.
Figure 3:
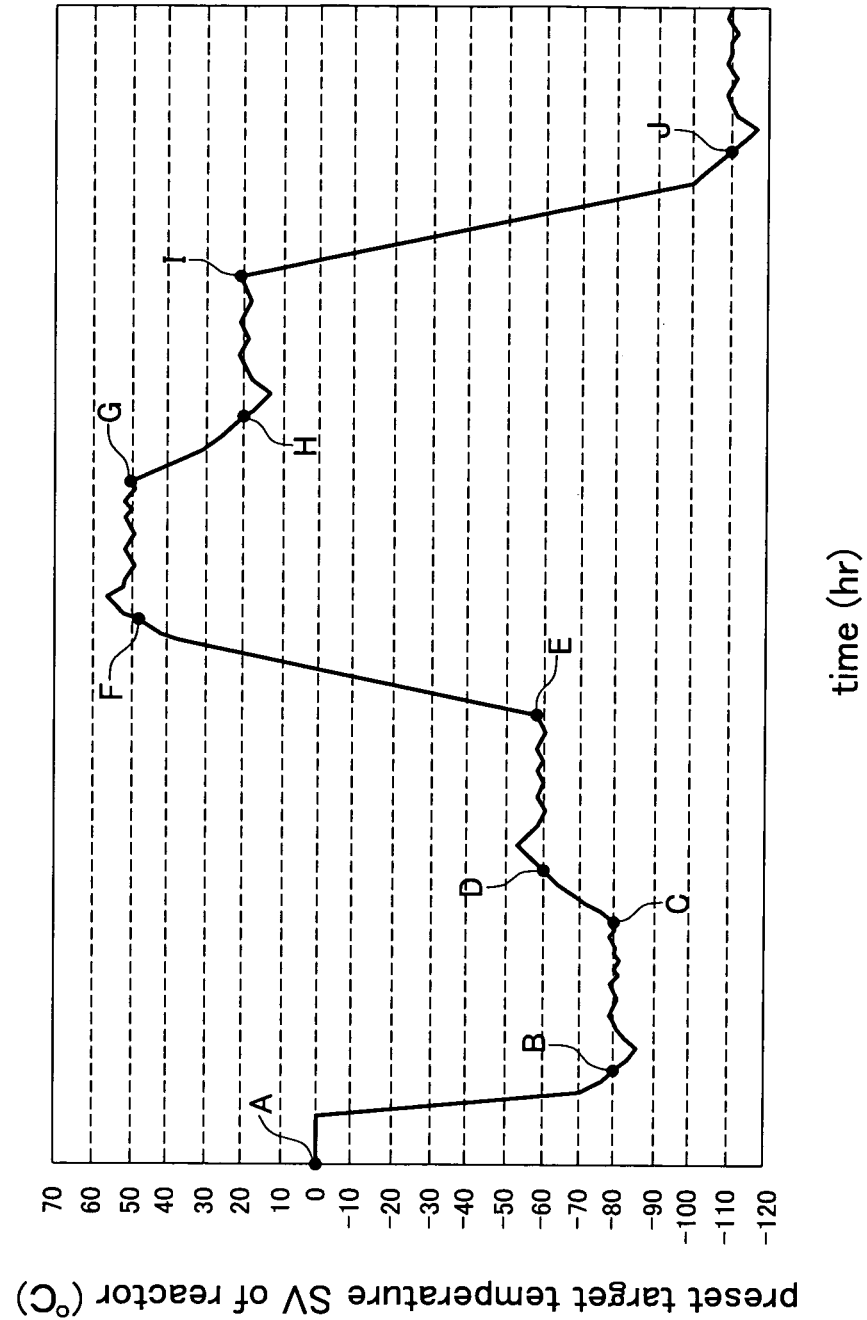
FIG. 3 is a graph of an example temperature time course.

As described above, based on the present temperature PV in the reactor 11, the preset target temperature SV, stable temperature range α and control switching temperature β, decisions are made according to the procedure shown in FIG. 2. In accordance with the four decisions of "stable heating", "stable cooling", "inclined heating" and "inclined cooling", the temperature control according to either of the heating control at the heating control unit or the cooling control at the cooling control unit is conducted. Owing to this procedure, a temperature control with a good control response characteristics, without wasteful heating or wasteful cooling, with ability to heat or cool efficiently the circulating heat medium, can be conducted stably over a broad temperature control range from a high temperature region to a low temperature region.

Even using a canned motor pump with a considerably large amount of heat intrusion as the circulation pump 14, addressing the first order lag element of the temperature control due to the heat intrusion at the circulation pump 14 by dividing the heating control on the higher temperature side of the control switching temperature β and the cooling control on the lower temperature side thereof, and optimizing the setting responding to the heat intrusion separately for the heating control and the cooling control, a stable temperature control suppressing the impact of the heat intrusion can be conducted. Further, by using a double element thermal sensing device for the heat medium thermal sensing device 23, from a single heat medium thermal sensing device 23 measured temperature signals can be output to the heating control unit and the cooling control unit respectively.

Since a control action at the heating control unit for conducting the "stable heating" and a control action at the cooling control unit for conducting the "stable cooling" can be respectively conducted by a conventional PID control, detailed descriptions are refrained.

The invention claimed is:

1. A heat medium heating-cooling apparatus comprising a reactor whose temperature is controlled by a heat medium; a heat medium heating unit that heats the heat medium by an indirect heat exchange with a heating fluid; a heat medium cooling unit that cools the heat medium by an indirect heat exchange with a cooling fluid; and a circulation pump and a line that circulate the heat medium through the reactor, the heat medium heating unit, and the heat medium cooling unit; wherein the heat medium heating-cooling apparatus further comprises a bypass line bypassing the heat medium heating unit; a switching valve switching the direction of a flow of the heat medium to the heat medium heating unit or the bypass line; a reactor temperature measuring means measuring the present temperature of the reactor; a heat medium temperature measuring means measuring the temperature of the heat medium fed to the reactor; a target temperature setting means setting a target temperature of the reactor; a stable temperature range setting means setting a tolerable range of a difference between the present temperature and the target temperature as a stable temperature range; a control switching temperature setting means setting a control switching temperature for switching a control between a cooling control and a heating control, when the difference between the present temperature and the target temperature is within the stable temperature range; a stable temperature deciding means deciding whether or not the temperature difference between the present temperature and the target temperature is within the stable temperature range; a first deciding means deciding which of the heating control or the cooling control is conducted within the stable temperature range by comparing the target temperature and the control switching temperature when the temperature difference is within the stable temperature range; a second deciding means deciding which of the heating control or the cooling control is conducted toward the target temperature by comparing the target temperature and the present temperature when the temperature difference is not in the stable temperature range; a heating control unit activating the heat medium heating unit to heat the heat medium when the first deciding means or the second deciding means decides on the heating control; and a cooling control unit activating the heat medium cooling unit to cool the heat medium when the first deciding means or the second deciding means decides on the cooling control.

2. The heat medium heating-cooling apparatus according to claim 1, wherein the heat medium temperature measuring means is a double element thermal sensing device that outputs measured temperature signals to the heating control unit and the cooling control unit respectively.

3. The heat medium heating-cooling apparatus according to claim 1, wherein the reactor temperature measuring means measures at least one of the temperature in the reactor, the temperature of the heat medium inflowing to a temperature regulating unit of the reactor, or the temperature of the heat medium outflowing from a temperature regulating unit of the reactor.

4. The heat medium heating-cooling apparatus according to claim 1, wherein the switching valve switches the flow of the heat medium to the bypass line when the cooling control unit conducts the cooling control on the heat medium.

5. A heat medium temperature control method for controlling the temperature of a heat medium in the heat medium heating-cooling apparatus according to claim 1, characterized in that, when the temperature difference between a present temperature of a reactor and a target temperature of the reactor is within a preset stable temperature range, the target temperature and a preset control switching temperature are compared and either of a heating control or a cooling control is conducted within the stable temperature range; and when the temperature difference between a present temperature of a reactor and a target temperature of the reactor is not within a preset stable temperature range, the target temperature and the present temperature are compared and either of a heating control or a cooling control is conducted toward the target temperature.

6. A heat medium temperature control method for controlling the temperature of a heat medium in the heat medium heating-cooling apparatus according to claim 2, characterized in that, when the temperature difference between a present temperature of a reactor and a target temperature of the reactor is within a preset stable temperature range, the target temperature and a preset control switching temperature are compared and either of a heating control or a cooling control is conducted within the stable temperature range; and when the temperature difference between a present temperature of a reactor and a target temperature of the reactor is not within a preset stable temperature range, the target temperature and the present temperature are compared and either of a heating control or a cooling control is conducted toward the target temperature.

7. A heat medium temperature control method for controlling the temperature of a heat medium in the heat medium heating-cooling apparatus according to claim 3, characterized in that, when the temperature difference between a present temperature of a reactor and a target temperature of the reactor is within a preset stable temperature range, the target temperature and a preset control switching temperature are compared and either of a heating control or a cooling control is conducted within the stable temperature range; and when the temperature difference between a present temperature of a reactor and a target temperature of the reactor is not within a preset stable temperature range, the target temperature and the present temperature are compared and either of a heating control or a cooling control is conducted toward the target temperature.

8. A heat medium temperature control method for controlling the temperature of a heat medium in the heat medium heating-cooling apparatus according to claim 4, characterized in that, when the temperature difference between a present temperature of a reactor and a target temperature of the reactor is within a preset stable temperature range, the target temperature and a preset control switching temperature are compared and either of a heating control or a cooling control is conducted within the stable temperature range; and when the temperature difference between a present temperature of a reactor and a target temperature of the reactor is not within a preset stable temperature range, the target temperature and the present temperature are compared and either of a heating control or a cooling control is conducted toward the target temperature.

* * * * *